United States Patent
Batistic

(10) Patent No.: US 7,802,494 B2
(45) Date of Patent: Sep. 28, 2010

(54) ELECTRICALLY DRIVEN PROPULSION SYSTEM

(76) Inventor: Robert N. Batistic, 757 S.E. 17th St., Box 1016, Ft. Lauderdale, FL (US) 33316

( * ) Notice: Subject to any disclaimer, the term of this patent is extended or adjusted under 35 U.S.C. 154(b) by 633 days.

(21) Appl. No.: 11/598,387

(22) Filed: Nov. 13, 2006

(65) Prior Publication Data

US 2008/0113840 A1    May 15, 2008

(51) Int. Cl.
*F16H 37/06*    (2006.01)
(52) U.S. Cl. .................................................. 74/665 B
(58) Field of Classification Search ............... 74/665 B; 440/4, 6; 60/716; 310/112
See application file for complete search history.

(56) References Cited

U.S. PATENT DOCUMENTS

| | | | | |
|---|---|---|---|---|
| 1,563,405 A * | 12/1925 | Schlumberger | ............... | 74/661 |
| 1,616,415 A * | 2/1927 | Day | ............... | 74/661 |
| 2,322,014 A * | 6/1943 | Grant | ............... | 440/75 |
| 2,463,349 A * | 3/1949 | Baner | ............... | 310/112 |
| 3,168,665 A * | 2/1965 | Holper | ............... | 310/112 |
| 3,207,002 A * | 9/1965 | Lakin et al. | ............... | 74/665 B |
| 3,390,585 A * | 7/1968 | Henne | ............... | 74/410 |
| 3,757,912 A * | 9/1973 | Ball et al. | ............... | 477/5 |
| 3,760,654 A * | 9/1973 | Fisher | ............... | 74/661 |
| 4,290,270 A * | 9/1981 | Meeh | ............... | 60/716 |
| 4,384,639 A | 5/1983 | Collin | | |
| 4,403,968 A * | 9/1983 | Heidrich et al. | ............... | 440/3 |
| 4,433,769 A * | 2/1984 | Scuccato et al. | ............... | 477/5 |
| 4,478,102 A * | 10/1984 | Ackermann et al. | ............... | 74/410 |
| 4,554,989 A | 11/1985 | Gruich et al. | | |
| 4,584,903 A | 4/1986 | Hirt et al. | | |
| 4,685,354 A * | 8/1987 | McCabria | ............... | 475/5 |
| 4,702,125 A | 10/1987 | Kalns | | |
| 4,727,770 A | 3/1988 | Ordo | | |
| 4,803,897 A | 2/1989 | Reed | | |
| 4,858,490 A * | 8/1989 | Grant | ............... | 74/661 |
| 5,463,914 A * | 11/1995 | Tyan | ............... | 74/661 |
| 5,618,211 A * | 4/1997 | Bourgoin | ............... | 440/4 |
| 5,785,563 A * | 7/1998 | Peaslee | ............... | 440/6 |
| 6,304,002 B1 * | 10/2001 | Dehlsen et al. | ............... | 290/1 C |
| 6,731,017 B2 * | 5/2004 | Mikhall et al. | ............... | 290/1 C |
| 6,994,646 B2 | 2/2006 | Ai | | |
| 7,101,307 B2 | 9/2006 | Clauson | | |
| 2003/0166362 A1 | 9/2003 | Varis | | |

FOREIGN PATENT DOCUMENTS

| | | |
|---|---|---|
| EP | 0239198 | 1/1987 |
| EP | 0852306 | 7/1998 |

* cited by examiner

*Primary Examiner*—Dirk Wright
(74) *Attorney, Agent, or Firm*—James David Johnson

(57) ABSTRACT

An electrically driven power system includes a carrier structure rotatably supporting a power output. A plurality of individually electrically powered primary drive units are also mounted in the carrier structure. Each of the power units are in driving engagement with the power output for driving said power output in a rotating manner. The electric motors driving the power units are interchangeable thus eliminating a single point motor failure and their smaller size facilitates ease of replacement and repair.

28 Claims, 4 Drawing Sheets

ELECTRICALLY DRIVEN PROPULSION SYSTEM

BACKGROUND OF THE INVENTION

1. Field of the Invention

The present invention relates to electric propulsion systems and more particularly to a propulsion system powered by a plurality of electric motors.

2. Discussion of the Related Art

For over a century, internal combustion engines have been a mainstay of portable or mobile propulsion systems. These engines have powered everything from automobiles to watercraft to airplanes. Additionally, these internal combustion engines have also been used to power various configurations of stationary machinery. In short, much of a person's everyday life is impacted by powered machines that are directly or indirectly linked to internal combustion engines.

Internal combustion engines possess many disadvantages. First, they are quite noisy and require substantial noise insulation if located in proximity to areas inhabited by humans for even brief periods of time. Further, internal combustion engines utilize fossil fuels that are pollutants if spilled or not handled in a correct manner. The combustion byproducts are also pollutants by injecting excess carbon dioxide, carbon monoxide, nitrous oxides, and forms of sulfur into the atmosphere. While strides have been made to reduce these pollutants, they will always be present in some quantity as a result of the burning of the fuel.

The majority of vehicles are powered by internal combustion engines and most often by a single internal combustion engine. Internal combustion engines are also inherently inefficient and thus require a substantial housing space with associated ventilation and insulation requirements. Even though the reliability of internal combustion engines has improved dramatically over the years, most vehicles are powered by only a single engine. The engine thus represents a single point of failure which can have disastrous and even life threatening results in the event of the engine failing. Further, in the event of a massive failure of the engine requiring its replacement, instead of the repair of a component, the engine must be removed from the vehicle. Often, this poses a very difficult and time-consuming effort resulting in considerable expense and downtime for the vehicle.

One solution has been the replacement of the internal combustion engine with an electric motor. However, electric motors also have some of the same disadvantages as the internal combustion engine. Typically, a single motor is used to provide driving power to each power output such as a single motor to drive each wheel of a car or the propeller of a watercraft. In those applications where a significant power output is required, a very large electric motor is required to provide such power. Again, a single motor equates to a single failure point. Additionally, as the power requirement increases, the size and weight of the electric motor also increases resulting in many of the same housing and replacement problems as an internal combustion engine.

Thus what is desired is an electric propulsion system that minimizes the probability of a single point failure while simultaneously being space adaptable and easy to repair and maintain.

SUMMARY OF THE INVENTION

The present invention is directed to an electrically driven power system that satisfies the need to minimize single point failures and is yet space adaptable and easy to maintain and repair. The electrically driven power system includes a carrier structure rotatably supporting a power output. A plurality of individually electrically powered primary drive units are also mounted in the carrier structure. Each of the power units are in driving engagement with the power output for driving said power output in a rotating manner.

Another aspect of the present invention is an electrically driven power system for providing a rotational power output including a carrier structure rotatably supporting a power output. An electrically powered primary drive unit is mounted in the carrier structure and is in driving engagement with the power output for driving the power output in a rotating manner. Additionally a plurality of individually electrically powered secondary drive units are mounted in the carrier structure such that each of the secondary power units are in driving engagement with the primary drive unit for augmenting the primary drive unit in driving the power output in a rotating manner.

Yet another aspect of the present invention is an electrically driven power system for providing a rotational power output. The power system includes a first carrier plate affixed to a second carrier plate in a substantially parallel spaced apart manner defining a gear space therebetween. A sun gear and at least one primary planet gear are supported in the gear space in a like manner such that the primary planet gear is intermeshed with the sun gear. At least one secondary planet gear is also supported in the gear space and intermeshed with the primary planet gear. An electric motor is drivably coupled to each primary planet gear and the secondary planet gear for providing power to the sun gear.

A further aspect of the present invention is an electrically driven power system for providing a rotational power output that includes a first carrier plate affixed to a second carrier plate in a substantially parallel spaced apart manner defining a gear space therebetween. A sun gear and a plurality of primary planet gears are rotatably supported in the gear space such that each primary plant gear independently meshes with the sun gear to permit the rotation of the sun gear. An electric motor is drivably coupled to each primary planet gears for providing individual power to each of the primary planet gears.

The planet gears can also be coupled to two axially aligned electric motors. The system is thus powered by a plurality of substantially identical motors that are interchangeable one with the others.

These and other features, aspects, and advantages of the invention will be further understood and appreciated by those skilled in the art by reference to the following written specification, claims and appended drawings.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENT

Figure 3:
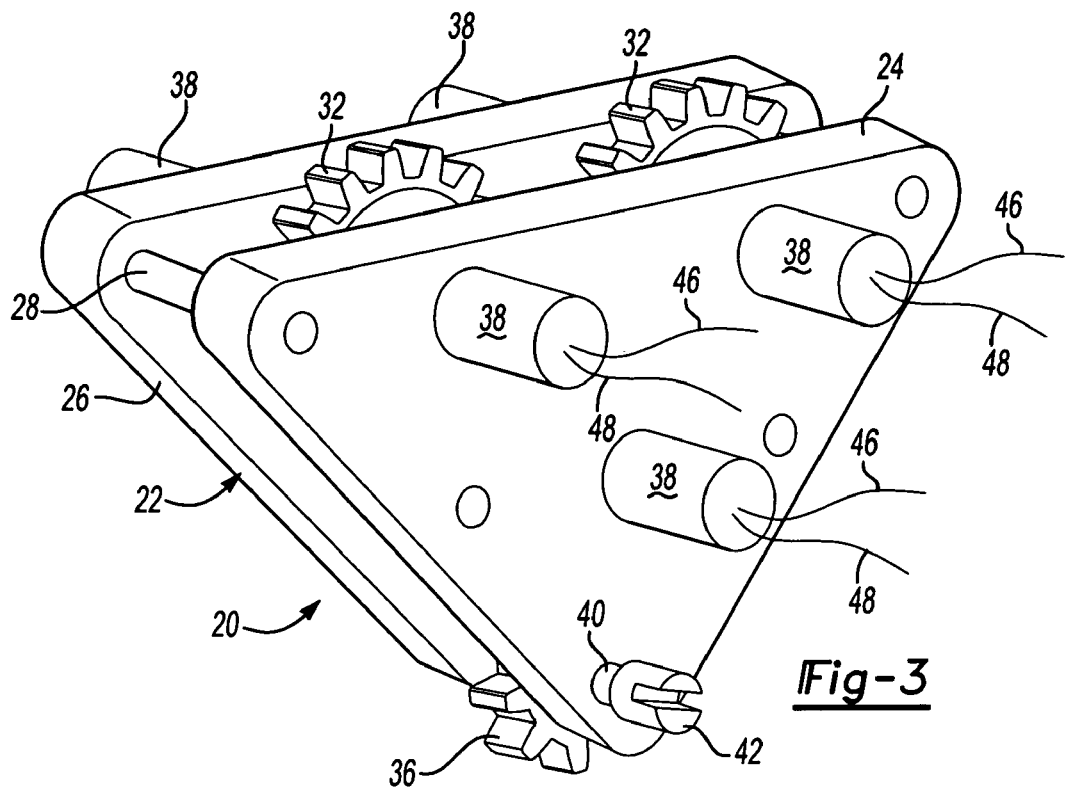
FIG. 3 is perspective view of the electric gear driven propulsion system.

For purposes of description herein, the terms "upper", "lower", "left", "rear", "right", "front", "vertical", "horizontal", and derivatives thereof shall relate to the invention as oriented in FIG. 3. However, one will understand that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
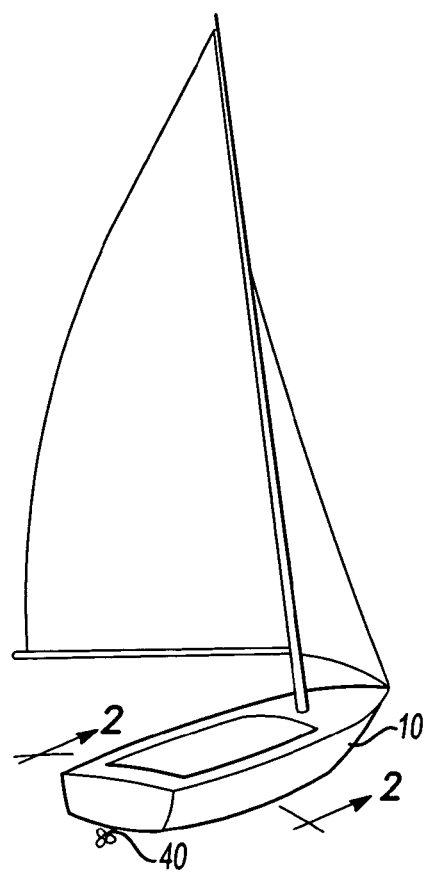
FIG. 1 is a general perspective view of a watercraft embodying the present invention.
Figure 2:
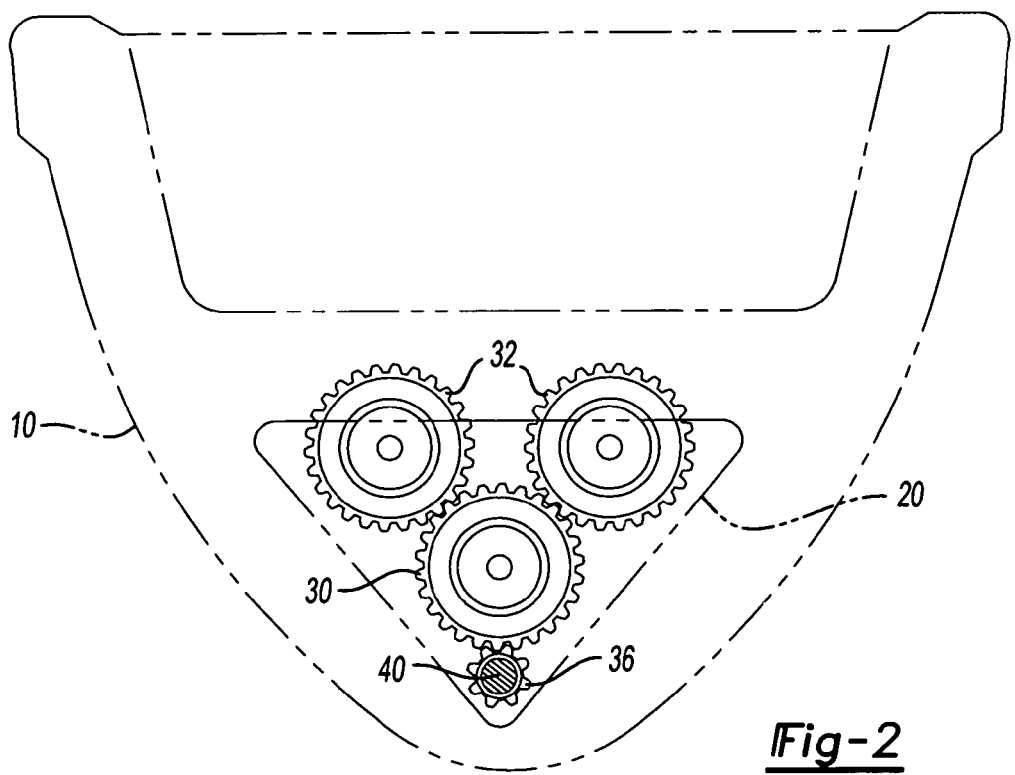
FIG. 2 is a cross-sectional elevation view of the watercraft shown in FIG. 1 and taken along the lines 2-2, FIG. 1 showing an electric gear driven propulsion system employed to power the watercraft.

Turning to the drawings, FIGS. 1 and 2 show a boat 10 incorporating an electrically driven power system 20 which is one of the preferred embodiments of the present invention and illustrates its various components which include planet gears 30, 32 (driven by a plurality of electric motors 38 receiving electric power from electric wires 46, 48, FIG. 3) engaged with sun gear 36 for rotating output shaft 40 for providing propulsive power to boat 10. Power system 20 can be a primary source of propulsion in a powerboat, or an alternative propulsion source for a sailboat 10 as shown in FIG. 1.

Turning to FIGS. 3-6, one configuration of electrically driven power system 20 is illustrated wherein a carrier structure 22 comprises a first carrier plate 24 and a second carrier plate 26 affixed one to the other by a plurality of standoffs 28. Standoffs 28 maintain first and second carrier plates 24, 26 in a spaced apart and substantially parallel relationship and define a gear space 25 therebetween. Carrier plates 24, 26 require no predefined geometric configuration and can be modified or tailored to conform to the space constraints of the parent structure in which electrically driven power system 20 is installed. Alternatively, carrier structure 22 can comprise an enclosed housing defining gear space 25. An enclosed carrier structure 22 additionally facilitates the retention of gear lubricant in proximity to gears 30, 32, 36.

Thus, electrically driven power system 20 can be geometrically configured to fit the application rather than tailoring the application to receive a predefined volume such as an internal combustion engine. This is especially advantageous in such applications as a marine craft wherein the shape of the application, i.e. boat hull, can be optimized for performance in the water and efficient use of space rather than compromised to receive a large internal combustion engine. The triangular configuration of carrier structure 22 is illustrative only and those skilled in the art will appreciate that the geometry of carrier 22 can assume infinite geometries as dictated by the parent structure in which it is to be installed.

Figure 4:
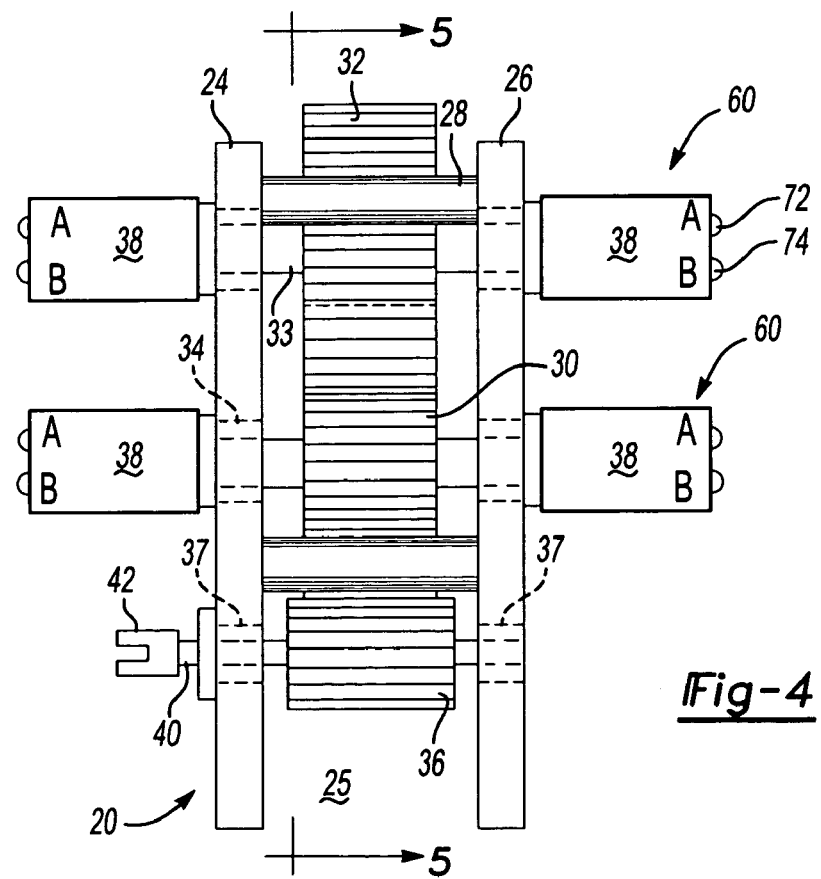
FIG. 4 is a side elevation view of the electric gear driven propulsion system of FIG. 3.

As most clearly illustrated in FIGS. 3 and 4, a sun gear 36 is positioned in gear space 25 between first and second carrier plates 24, 26 and is affixed to power output shaft 40. Power output shaft 40 is rotatably supported in first and second carrier plates 24, 26 by bearings 37 and extends from carrier structure 22. Power output shaft can terminate with a coupler 42 for engaging a propulsive device such as a propeller or other device such as a pulley or gear for further transference of power generated by electrically generated power system 20.

Figure 6:
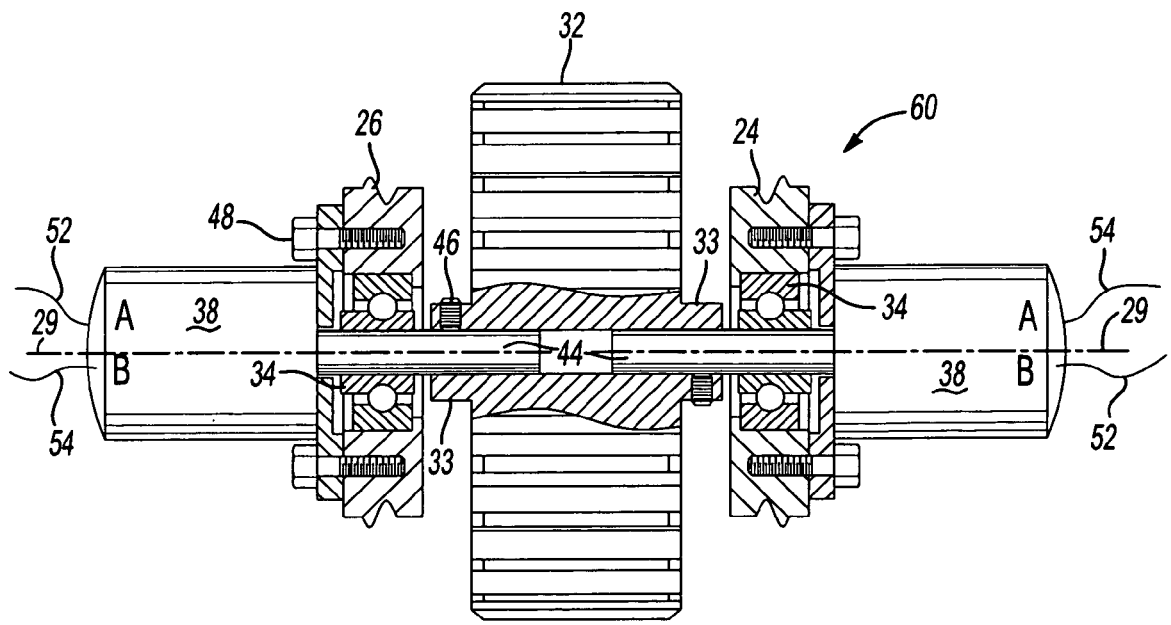
FIG. 6 is an elevation cross-sectional view of an individual drive assembly mounted in the carrier and taken along the lines 6-6, FIG. 5.

A plurality of drive units 60 are mounted and rotatably supported in carrier structure 22 in a manner such that the power generated by each of drive units 60 are combined for transference to sun gear 36. FIG. 6 illustrates a sample drive unit 60. Each drive unit 60 includes a planet gear 30 when a drive unit 60 is utilized as a primary drive or a planet gear 32 when a drive unit 60 is utilized as a secondary drive (as shown). Planet gears 30, 32 include a plurality of teeth around its periphery for intermeshing with the teeth of sun gear 36 and other planet gears 30, 32 in a manner well known in the art. Those practiced in the art will readily recognize that the diameters of sun gear 36 and planet gears 30, 32 can be set at a desired ratio at the design stage of power system 20 to provide the desired torque or rotational speed of output shaft 40.

Figure 7:
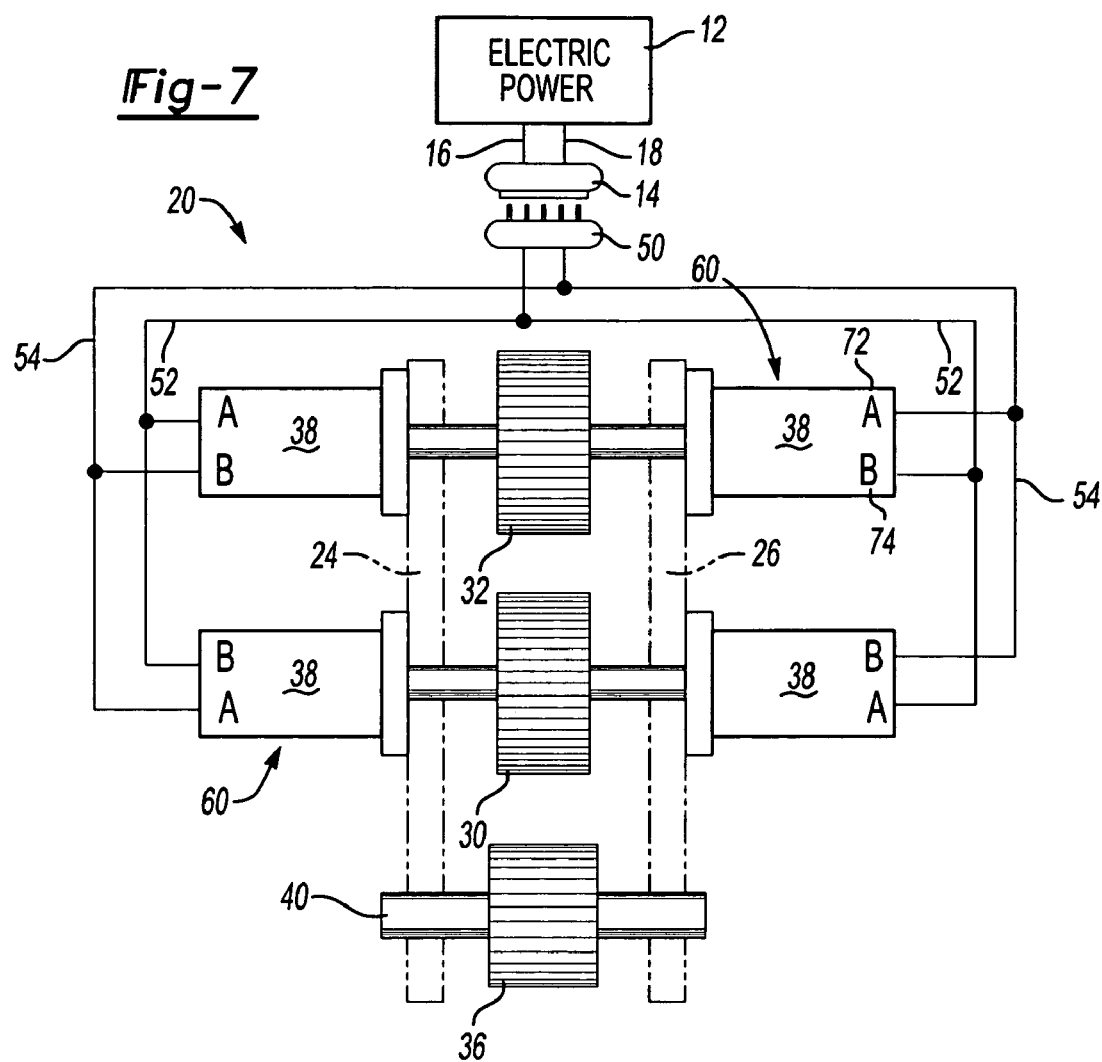
FIG. 7 is an electrical schematic illustrating the wiring scheme for powering the propulsion system.

Planet gear 32 defines an axis of rotation 29 on which are located a pair of electric motors 28. Electric motors 38 are coupled to planet gear 30 or 32 with motor shaft 44. Planet gears 30, 32 can be affixed to shafts 44 by utilizing set screws 46 through gear hub 33 to bear on shaft 44 to maintain planet gears 30, 32 in a fixed relationship to shafts 44 and to thus rotate in concert with shafts 44. Electric motors 38 include wiring terminals A and B (here designated by 72, 74, FIG. 4) for the connection of live conductor 52 and neutral conductor 54 to deliver electrical power to electric motors 38 (the wiring schematic is illustrated in FIG. 7 and discussed below). While drive unit 60, as illustrated, incorporates two axially aligned electric motors 38, one of the motors 38 can optionally be deleted from a particular drive unit to conform to space constraints of the structure in which electrically driven power system 20 is housed. Thus, the total power required of power system 20 is satisfied by incorporating the necessary number of individual drive units 60, which is a direct function of the number of electric motors 38. If one particular drive unit 60 can only employ one electric motor 38, the total power output of system 20 can be maintained by the inclusion of an additional drive unit 60 with one or two electric motors 38.

Each of the individual drive units 60 are mounted in carrier structure 22 such that planet gears 30, 32 are substantially co-planar with sun gear 36 in gear space 25. Electric motors 38 are affixed to first and second carrier plates 24, 26 in a fixed manner such as with fasteners 48 to prevent rotation of motors 38 with respect to carrier structure 22. Shafts 44 can further be rotatably supported in carrier plates 24, 26 with bearings 34 to provide rotational stability to planet gears 30, 32.

Figure 5:
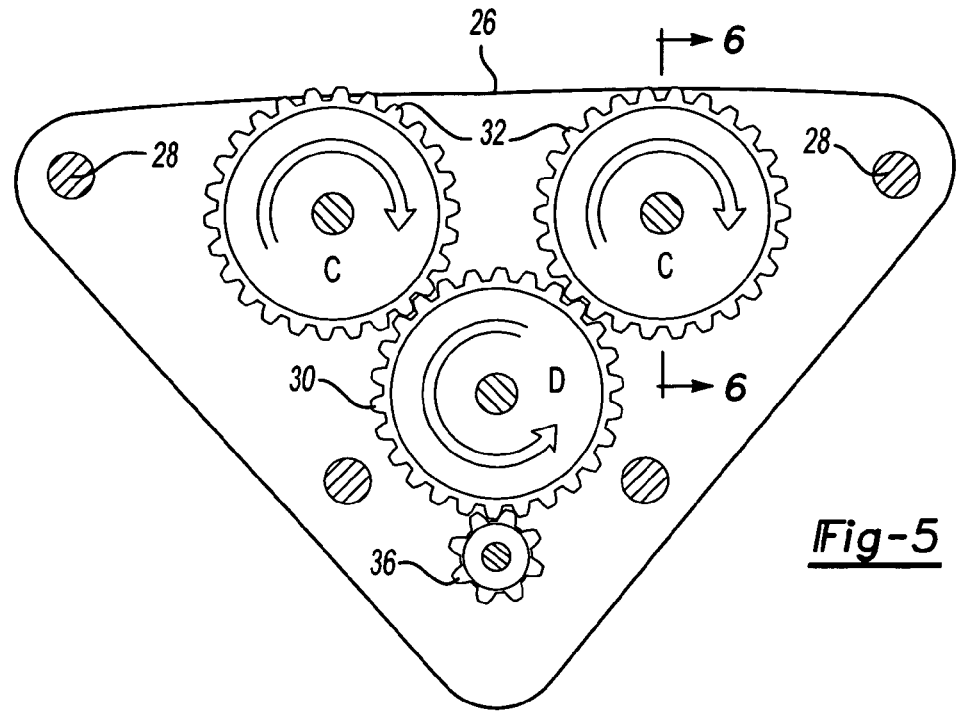
FIG. 5 is an elevational cross-section view of the electric gear driven propulsion system shown in FIG. 4 taken along the lines 5-5, FIG. 4.

Referring now to FIG. 5, and for purposes of illustration, a primary planet gear 30 (and its associated drive unit 60) is defined as being in direct intermeshing engagement with sun gear 36, and a secondary planet gear 32 (and its associated drive unit 60) is defined as being in direct intermeshing engagement with a primary planet gear 30 or another secondary planet gear 32. A primary planet gear 30 transmits the power obtained from its associated electric motors 38 by rotating according to directional arrow "D." The next adjacent intermeshing secondary planet gears 32 transmit the power obtained from their associated electric motors 38 by rotating according to directional arrow "C." In this manner the entire arrangement of sun gear 36, primary planet gears 30, and secondary plant gears 32 rotate in an intermeshing fashion to drive output shaft 40 in a desired rotational manner.

FIG. 7 illustrates the electrical configuration of the individual electrical motors 38 and corresponds to the physical configuration of power system 20 as shown in FIG. 4. Each electrical motor 38 has an "A" terminal 72 and a "B" terminal 74. In order for both motors 38 of a drive unit 60 to power its associated planet gear 30, 32 in one direction, one of motors 38 must rotate clockwise and the other of motors 38 must rotate counterclockwise. Since, motors 38 are preferably identical for interchangeability purposes, the motors 38 must be electrically wired to provide the desired rotational direction of the motor 38. As shown in FIG. 7, an electrical power supply 12 delivers live electrical power through live lead 16 with a corresponding neutral lead 18 to complete the power circuit. While the motors 38 could be hard wired to electrical power supply 12, a plug 50 and receptacle 14 are most preferably utilized for convenient disconnection of electric power from power system 20. Plug 50 is wired such that when connected to receptacle 14, lead 52 becomes the live conductor and lead 54 becomes the neutral conductor.

In order to correctly drive electric motors 38, live conductor 52 is connected to terminal "A" of the rightmost electric motor 38 associated with primary planet gear 30 and neutral conductor 54 is connected to terminal "B" of the motor 38 thereby rotating primary planet gear according to directional arrow "D" (FIG. 5). Concurrently, live conductor 52 is connected to terminal "B" of the leftmost motor 38 associated with primary planet gear 30 and neutral conductor 54 is connected to terminal "A." In this manner, motors 38 while identical, can simultaneously power primary planet gear 30 while oriented in axial opposition one to the other. In like manner, secondary planet gear 32 rotating oppositely to primary planet gear 30 (direction "C", FIG. 5), is electrically connected in reverse manner, i.e. the rightmost motor associated therewith has its terminal "B" connected to live conductor 52 and its terminal "A" connected to neutral conductor 54. The leftmost motor 38 is thus likewise electrically connected in reverse manner.

While FIG. 7 shows a typical wiring scheme representative of motors 38 being DC motors, electric power source 12 could also be an AC power supply with motors 38 being AC motors. Those practiced in the art will recognize that the wiring interconnecting power source 12 with motors 38 in an alternating current system can be modified from that shown to power motors 38 in the desired direction of rotation.

Alternatively, power system 20 can employ alternate means of power other than electricity, such as hydraulic power. In a configuration utilizing hydraulic power, power source 12 becomes a source of pressurized hydraulic fluid. Live conductor 52 in turn becomes a pressurized hydraulic supply line while neutral conductor 54 becomes a hydraulic fluid return line. The medium of energy transfer becomes hydraulic fluid flowing through the supply and return lines instead of electric current. Finally, motors 38 become hydraulic motors instead of electric motors.

FIG. 7 also illustrates each motor 38 as being hard wired to live conductor 52 and neutral conductor 54. However, those practiced in the art will recognize that a plug and receptacle can be introduced between each motor 38 and conductors 52, 54 to facilitate the disconnection of a single motor 38 from electrical power supply 12.

Figure 8:
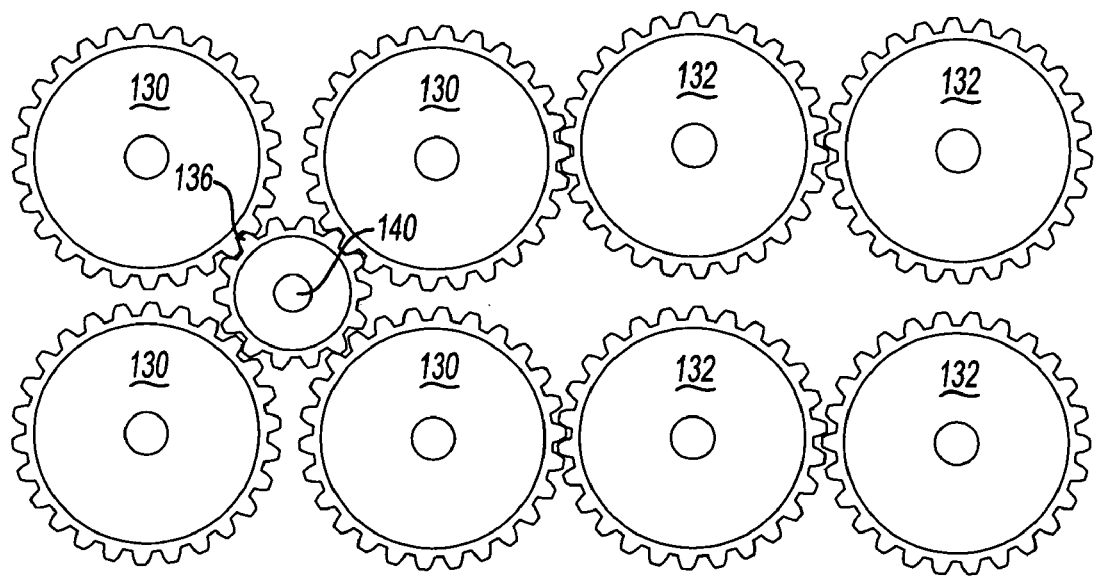
FIG. 8 is an alternate gearing configuration illustrating the adaptability of the electric gear driven propulsion system.

While FIGS. 2-7 illustrate a power system 20 having one primary planet gear 30 in driving engagement with sun gear 36 and two secondary planet gears 32 in driving engagement with primary planet gear 30 thereby augmenting the driving power of primary planet gear 30, other configurations are also contemplated. With reference to FIG. 8, one or more of the concepts illustrated can be incorporated to customize a power system to a particular need and configuration. A power output 140 such as a rotating shaft is coupled to sun gear 136. Sun gear 136 can be driven by a plurality of primary planet gears 130 (each planet gear representing an associated drive unit 60). A primary planet gear 130 can independently drive sun gear 136 or can be augmented by one or more secondary planet gears 132. One or more first secondary planet gears 132 engage a primary planet gear 130 to augment its power. One or more second secondary planet gears 132 can in turn engage a first secondary planet gear 132 to form a chain of secondary planet gears extending from a primary planet gear 130. Thus, a specific application can incorporate in combination any number and arrangements of primary planet gears, first secondary planet gears, and second secondary planet gears with their associated motors to satisfy a particular power requirement.

In the instances where insufficient space is present to chain together a required number of drive units, two or more electrically driven power systems such as system 20 can be chained together in series along a common power output shaft to provide the required power demanded by the application. Those practiced in the art will recognize that the possible combinations and configurations of drive units 60 to comprise an electrically driven power system are infinite.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the doctrine of equivalents.

I claim:

1. An electrically driven power system for providing a rotational power output, said power system comprising:
   a carrier structure;
   a power output rotatably supported in said carrier structure;
   a plurality of individually electrically powered primary drive units mounted in said carrier structure, each said power unit in driving engagement with said power output for driving said power output in a rotating manner; and
   at least a first secondary drive unit mounted in said carrier structure, said first secondary drive unit being independently powered separate from said primary drive units and further wherein said first secondary drive unit is coupled in driving engagement with one of said primary drive units;
   a second secondary drive unit mounted in said carrier structure, said secondary drive unit being independently powered separate from others of said drive units and further wherein said second secondary drive unit is coupled in driving engagement with said first secondary drive unit.

2. The electrically driven power system according to claim 1 wherein said power output of said system is a sun gear and an output shaft affixed to said sun gear to rotate in concert therewith.

3. The electrically driven power system according to claim 2 wherein each said primary drive unit and said secondary drive unit comprises:
   a first electric motor for providing rotational power through a power output;

a shaft rotatably coupled to said first electric motor power output; and a planet gear having a first side affixed to said shaft for receiving said rotational power of said first electric motor and rotating in concert therewith.

4. The electrically driven power system according to claim 3 wherein at least one of said primary and said secondary drive units further comprises a second electric motor and second shaft affixed to a second side of said planet gear.

5. The electrically driven power system according to claim 4 wherein said planet gear of each of said primary drive units is intermeshingly engaged with said sun gear.

6. The electrically driven power system according to claim 5 wherein said planet gear of each of said secondary drive units is intermeshingly engaged with a said planet gear of at least one of said primary and said secondary drive units.

7. The electrically driven power system according to claim 6 wherein said carrier structure comprises:

a first carrier plate; and a second carrier plate affixed to said first carrier plate in a substantially parallel spaced apart manner defining a gear space therebetween.

8. The electrically driven power system according to claim 7 wherein said sun gear and said planetary gears are positioned in said space between said first and said second carrier plates.

9. The electrically driven power system according to claim 8 wherein said first electric motors are affixed to said first carrier plate and said second electric motors are affixed to said second carrier plate.

10. The electrically driven power system according to claim 9 wherein said electric motors are all interchangeable one with the others.

11. An electrically driven power system for providing a rotational power output, said power system comprising:

a carrier structure;

a power output rotatably supported in said carrier structure;

an electrically powered primary drive unit mounted in said carrier structure, said primary power unit in driving engagement with said power output for driving said power output in a rotating manner; and a plurality of individually electrically powered secondary drive units mounted in said carrier structure, each said secondary power unit in driving engagement with said primary drive unit for augmenting said primary drive.

12. The electrically driven power system according to claim 11 wherein said power output of said system is a sun gear and an output shaft affixed to said sun gear to rotate in concert therewith.

13. The electrically driven power system according to claim 12 wherein each said primary drive unit and said secondary drive unit comprises:

a first electric motor for providing rotational power through a power output;

a shaft rotatably coupled to said first electric motor power output; and a planet gear having a first side affixed to said shaft for receiving said rotational power of said first electric motor and rotating in concert therewith.

14. The electrically driven power system according to claim 13 wherein at least one of said primary and said secondary drive units further comprises a second electric motor and second shaft affixed to a second side of said planet gear.

15. The electrically driven power system according to claim 14 wherein said sun gear and said planet gears are intermeshingly engaged to permit rotation of said sun gear in a desired direction.

16. The electrically driven power system according to claim 15 wherein said electric motors are all interchangeable one with the others.

17. An electrically driven power system for providing a rotational power output, said power system comprising:

a first carrier plate;

a second carrier plate affixed to said first carrier plate in a substantially parallel spaced apart manner defining a gear space therebetween;

a sun gear rotatably supported in said gear space;

at least one primary planet gear supported in said gear space in like manner and intermeshed with said sun gear;

at least one secondary planet gear supported in said gear space in like manner and intermeshed with said primary planet gear; and an electric motor drivably coupled to each of said primary planet gear and said secondary planet gear for providing power to said power system.

18. The electrically driven power system according to claim 17 wherein at least one of said primary and said secondary planet gears is powered by both a first electric motor and a second electric motor.

19. The electrically driven power system according to claim 18 wherein said first electric motor is drivably coupled to a first side of said planet gear and said second electric motor drivably coupled to a second side of said planet gear, said first electric motor, said second electric motor, and said planet gear aligned along an axis of rotation.

20. The electrically driven power system according to claim 19 wherein said first electric motor is rigidly affixed to said first carrier plate and said second electric motor is rigidly affixed to said second carrier plate.

21. The electrically driven power system according to claim 20 wherein all said electric motors are interchangeable one with the others.

22. The electrically driven power system according to claim 17 further including at least a second secondary planet gear supported in said gear space and intermeshed with said at least one secondary planet gear, said second secondary planet gear coupled to at least one electric motor.

23. An electrically driven power system for providing a rotational power output, said power system comprising:

a first carrier plate;

a second carrier plate affixed to said first carrier plate in a substantially parallel spaced apart manner defining a gear space therebetween;

a sun gear rotatably supported in said gear space;

a plurality of primary planet gears supported in said gear space in like manner, each said primary planet gear intermeshed with said sun gear;

an electric motor drivably coupled to each of said primary planet gears for providing power to primary planet gears;

at least one secondary planet gear supported in said gear space in like manner, said secondary planet gear intermeshed with at least one of the primary planet gears; and an electric motor drivably coupled to said at least one secondary planet gear for providing power to said at least one secondary planet gear.

24. The electrically driven power system according to claim 23 wherein at least one of said primary and said secondary planet gears is powered by both a first electric motor and a second electric motor.

25. The electrically driven power system according to claim 24 wherein said first electric motor is drivably coupled to a first side of said planet gear and said second electric motor drivably coupled to a second side of said planet gear, said first electric motor, said second electric motor, and said planet gear aligned along an axis of rotation.

26. The electrically driven power system according to claim 25 wherein said first electric motor is rigidly affixed to said first carrier plate and said second electric motor is rigidly affixed to said second carrier plate.

27. The electrically driven power system according to claim 26 wherein all said electric motors are interchangeable one with the others.

28. The electrically driven power system according to claim 27 further including at least a second secondary planet gear supported in said gear space and intermeshed with said at least one secondary planet gear, said second secondary planet gear coupled to at least one electric motor.

* * * * *